Patented Nov. 23, 1926.

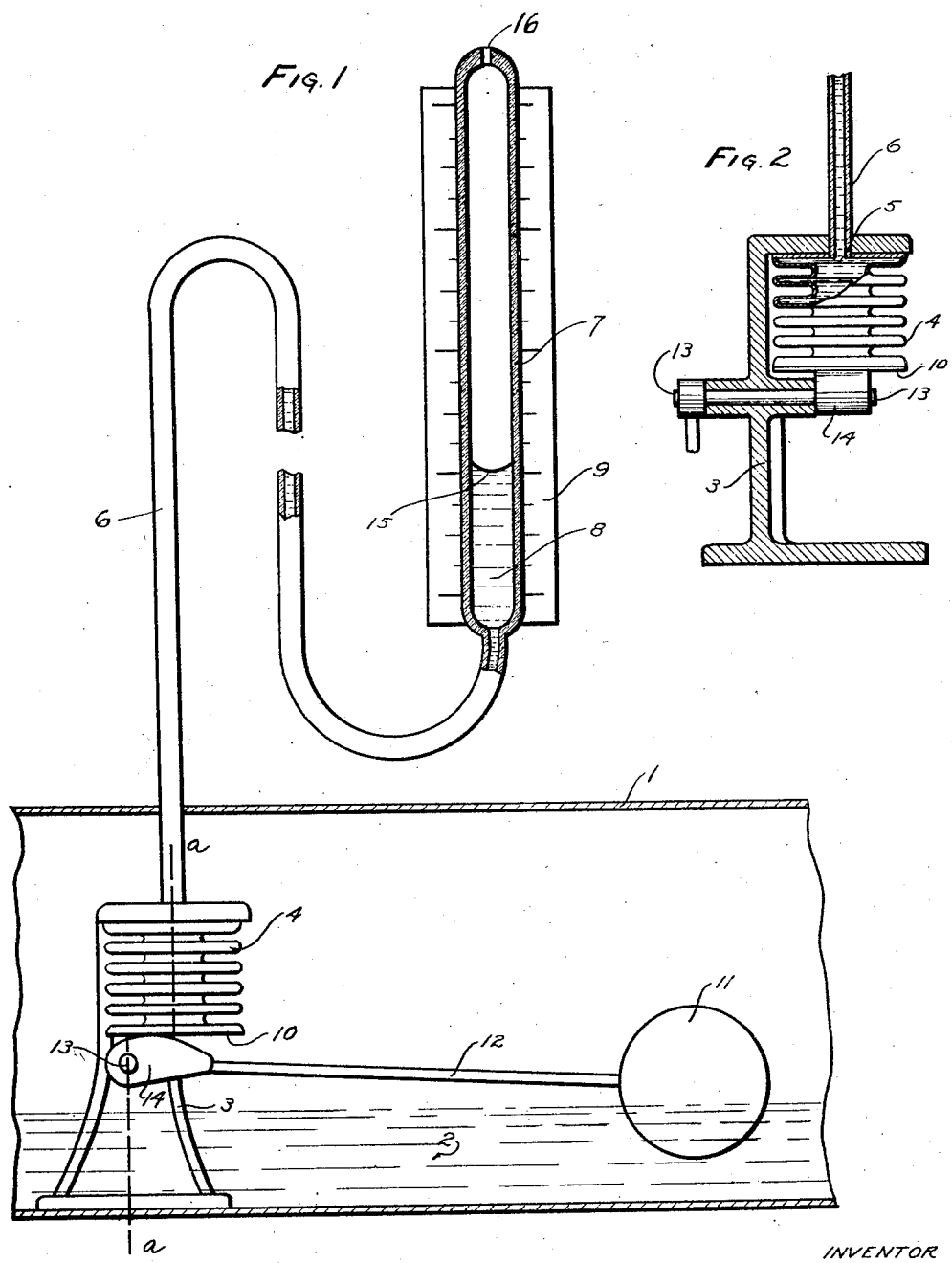

1,607,706

UNITED STATES PATENT OFFICE.

HARRY A. TOULMIN, JR., OF DAYTON, OHIO, ASSIGNOR TO THE GROLAN MANUFACTURING COMPANY, OF DAYTON, OHIO, A CORPORATION OF DELAWARE.

LIQUID-LEVEL GAUGE.

Application filed February 26, 1921. Serial No. 447,937.

My invention relates to liquid level gauges and in particular to gauges for indicating the quantity or depth of liquid in tanks.

It is my object to provide an instrument which will indicate the quantity or depth of the liquid in the tanks, especially where the indicating gauge is located at a distance from the tank. It is my object to provide an indicator which will not be affected by changes in altitude. It is a further object of my invention to provide a gauge which may have the connection between the indicator and the actuator located in any desired position compensating for any elevation and adapted to fit into corners, around curves and into difficult and inaccessible locations. It is an object of the invention to provide a gauge employing primarily a liquid medium in a capillary tube.

Referring to the drawings:

Fig. 1, is a view of the complete device with the tank in section and the indicator tube in section; and, Fig. 2, is a detail of the actuator.

Referring to the drawings, 1 is a tank containing the liquid 2. This tank has mounted therein a support 3 supporting a metallic flexible container 4 that is adapted to be compressed and which will expand of its own accord to a predetermined extent. This container communicates at 5 with a tube 6, preferably a capillary tube, that extends to the indicator portion 7 of the tube. 8 is the liquid therein, 9 is a scale indicating weight, gallons or any other measure that is found desirable to use.

Adjacent the bottom 10 of the compressible actuator 4 is the float mechanism. This consists of a float 11 attached to an arm 12 and pivoted at 13 to the support 3. This arm 12 carries a cam 14 which engages with the bottom 10 of the actuator 4.

In operation, as the float 11 rises or falls, it will move the cam 14 and thus compress the actuator 4 or allow it to expand. As the actuator is moved the liquid therein, which is preferably viscous is moved either inwardly or outwardly and thus the liquid in the tube is likewise moved so that the top of the liquid at 15 moves up and down in the tube 7 indicating the level of the liquid in the tank 1.

In order to eliminate any air pressure which might affect the operation of the device, a fine opening 16 is left at the top of the tube 7 for the passage inwardly and outwardly of air.

Figure 2 is shown in section on the line a—a of Figure 1.

In practice, it is desirable to employ a capillary tube, although that is not essential to my invention broadly. Glycerine is the preferred liquid to be used because of its low freezing point, although it is not an essential as any liquid may be used, but because of the density and slow moving characteristics of a heavy viscous liquid, I prefer the latter.

Any desired form of compressible container may be employed. I have illustrated one type made of very thin metal with a relatively heavy bottom plate for contact with the cam 14. This container would expand of its own volition to the slight extent necessary for this movement.

It will be understood that by compressing the large area of liquid into the small tube, considerable power is developed and the liquid is moved in the tube easily despite the capillary attraction. I also provide the indicator tube of such a size that it will not be subject to capillary attraction and the liquid will therefore not crawl up the tube as might be the case if the tube were very small and the capillarity was very strong when a liquid of a high degree of surface tension was employed.

While I have shown and described certain features as constituting my invention, it will be understood that parts have been shown for purposes of illustration only, and that I do not desire to be limited to such details, as obvious modifications will occur to a person skilled in the art.

It is to be noted that the bellows or flexible container 4 is mounted upon a support 3, and that a cam fulcrumed directly to the support and constituting a member of the float arm operates on the bellows or flexible container, as the float 11 responds to the liquid level in the tank. The fact is, there is a direct connection between the cam 14 and the bellows, whereas heretofore there are elements intermediate the cam and the bellows. In this way, it is obvious that the inventor is not only simplifying devices of this kind, but is reorganizing known elements and thereby producing such devices at much less cost, and yet at the same time producing a more positive operation. Further-more, the bellows or flexible container has a capillary tube connecting direct with the indicator tube 7. While these tubes 6 and 7 are designed to be constructed of any suitable transparent material, it is not absolutely necessary that such material be used. Such transparent material, as glass for instance, may be used though not necessarily, for it is obvious that white zylonite, or in other words celluloid, made from any suitable cellulose may be used in the construction of the tubes 6 and 7, thereby eliminating any fragility that might cause a fracture of either tube.

The purpose of the capillary tubes 6 and 7 is to eliminate any leg in the indication of the changes of the liquid level in the tank. This results from the fact that the capillary tubes retain continually its liquid by virtue of the phenomenon of the capillarity. In other words, should there be any lag in the liquid in the tubes, it will be easily visible.

Having thus fully described my invention, what I claim as new and desire to secure by Letters Patent, is:

1. In a device of the character described, a tank, a support therein and a bellows attached at its upper end to the support, a float having a stem pivoted to the support and having a cam thereon, said cam bearing against the bottom of the bellows, a capillary tube connected with the interior of the bellows, said tube having an enlarged transparent outer end open at its top and having a scale parallel therewith near its end.

2. In a device of the character described, a tank, a support therein, having an overhanging top end, a bellows resting against said overhanging end, a float having a stem pivoted to the support, said stem having a cam thereon bearing against the bottom of the bellows, a capillary tube extended from the top of the bellows and having at its outer end a transparent tube of larger bore open at its top, and having a scale parallel therewith near its end.

3. In a device as set forth, the combination with a tank to contain liquid, of a support therein, provided with an overhanging top end, a bellows resting against the end face of said overhanging end, a rocking shaft journaled in a bearing of the support and provided with a cam at one end bearing against the bottom of the bellows, a float having a stem fixed to the other end of the said shaft, the float being responsive to the liquid level in the tank for causing the cam to actuate the bellows, a capillary transparent tube extending from the top of the bellows and terminating at its outer end in a tube of larger bore opening at its top, and a scale near the outer end of the tube.

In testimony whereof, I affix my signature.

HARRY A. TOULMIN, Jr.